J. L. HALL.
PROJECTOR CONTROL.
APPLICATION FILED SEPT. 27, 1912.
1,060,754.
Patented May 6, 1913.
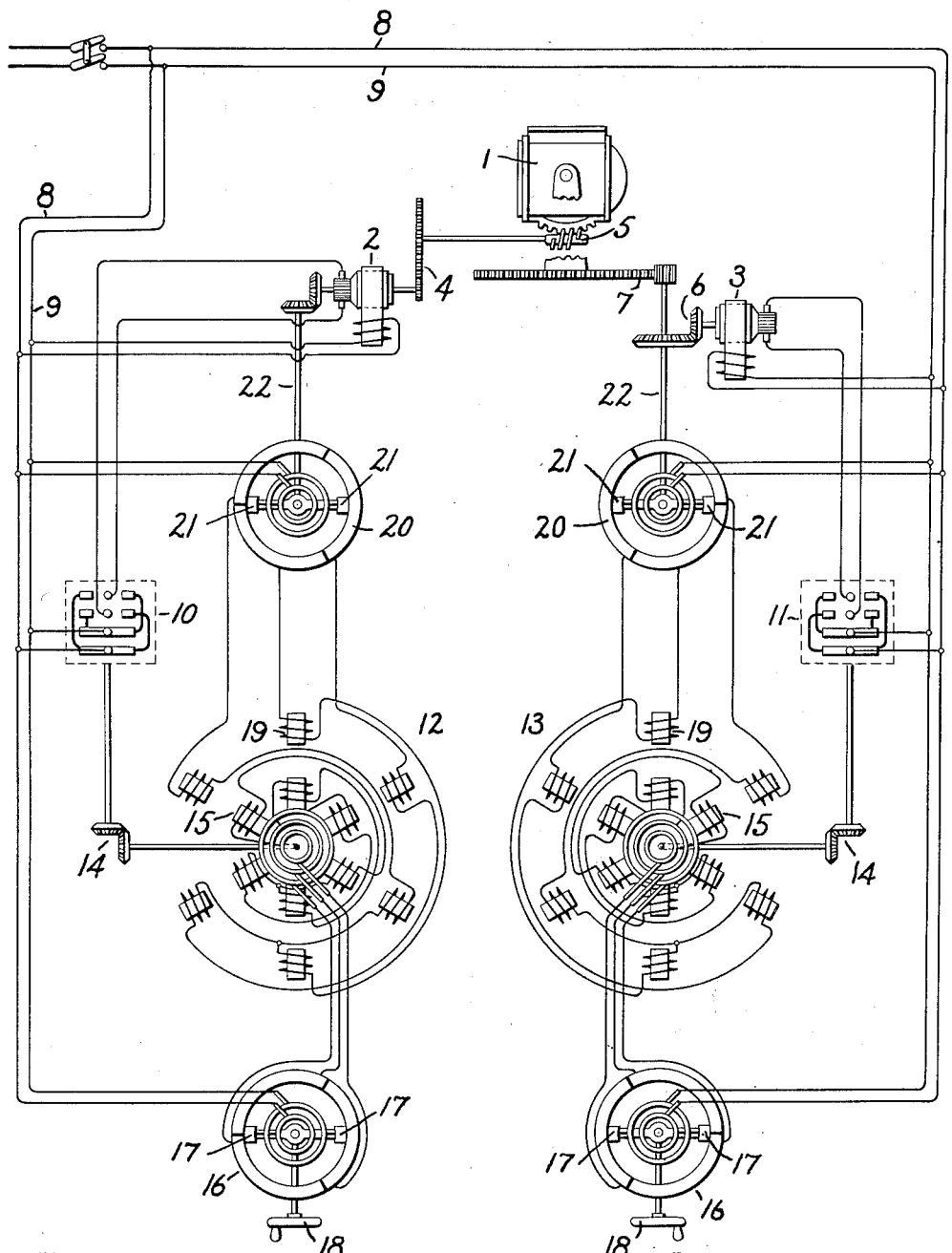
Witnesses:
Inventor:
John L. Hall,
by
His Attorney.

UNITED STATES PATENT OFFICE.

JOHN L. HALL, OF SCHENECTADY, NEW YORK, ASSIGNOR TO GENERAL ELECTRIC COMPANY, A CORPORATION OF NEW YORK.

PROJECTOR CONTROL.

1,060,754. Specification of Letters Patent. Patented May 6, 1913.

Application filed September 27, 1912. Serial No. 722,639.

*To all whom it may concern:*

Be it known that I, JOHN L. HALL, a citizen of the United States, residing at Schenectady, county of Schenectady, State of New York, have invented certain new and useful Improvements in Projector Control, of which the following is a specification.

This invention relates to the control of searchlight projectors and the like, and has for its object the provision of means whereby devices of this character may be controlled from a remote point in a simple and efficient manner.

The invention consists in a mechanically operated commutating device connected to the rotor of a synchronous pilot motor. The successive energization of the coils of said motor causes it to revolve with respect to a surrounding set of stationary field coils. The rotor actuates a reversing switch in circuit with a motor geared to the projector. Another commutating device is actuated by said projector motor and sets up a rotating field in the stator of the pilot motor in the opposite direction to that in the rotor. When the speed of the two fields are equal, the rotor of the pilot motor will remain stationary and hold the reversing switch in the position to which it has been carried by the first movement of the pilot motor. The projector will thereupon continue to move so long as the mechanical commutator is rotated. If the commutator is stopped, the switch will be brought back to the intermediate or "stop" position by the rotating field in the stator of the pilot motor and the projector will then come to rest. In other words, the pilot motor operates like a differential gear, but performs this function electrically instead of mechanically. By providing two sets of apparatus, the projector can be trained in azimuth by one set and in altitude by the other.

The accompanying drawing is a diagrammatic representation of the system of control which forms the subject of my invention.

The device to be controlled is illustrated as a searchlight projector 1, though it is evident that my invention is not limited to this particular use. This projector is arranged to be trained in a vertical plane (altitude) by the motor 2 and in a horizontal plane (azimuth) by the motor 3. The motor 2 trains in altitude from the spur gearing 4 and worm gearing 5 on the projector; the motor 3 trains in azimuth through the bevel gearing 6 and the spur 7 which rotates the turntable upon which the projector is mounted. The particular arrangement of motors and the gearing between these motors and the projector form no part of my present invention. The motors 2 and 3 rotate in either direction depending on the direction of current through the armature, and have separately excited fields. Current is supplied to the motors from the positive and negative mains 8 and 9. The armature circuits of the motors are controlled respectively by the drum controllers 10 and 11 which operate simply to reverse the connections with the mains 8 and 9. These controllers are operated by the rotors of two synchronous pilot motors 12 and 13 through suitable gearing 14.

Inasmuch as the two sets of controlling apparatus for the two motors 2 and 3 are identical, a description of one will suffice for both. The pilot motor has a rotor provided with several coil wound poles 15, preferably six in number, opposite coils being connected in series, and all three pairs having one terminal connected in Y, while their other terminals are respectively connected with three collecting rings. The brushes on these rings are connected respectively with three segments of a commutating device 16. Two opposite brushes 17 respectively connected with the mains 8 and 9 by collecting rings and brushes, can be rotated over said segments by a hand wheel 18. Surrounding the multipolar motor 15 of the pilot motor is the stator composed of six stationary field coils 19, spaced equally apart. Diametrically opposite coils are connected in series, and the three pairs are all connected at one end in Y while their other terminals are respectively connected with the three segments of a commutating device 20. Two opposite brushes 21 sweep over these segments and are connected respectively by collecting rings and brushes with the mains 8 and 9. The brushes 21 are mounted on a shaft 22 which is geared to the training motor.

The operation is as follows: The operator turns the hand-wheel 18, thereby rotating the brushes 17 and sending current successively through the pairs of coils 15 of the rotor of the pilot motor. This sets the rotor to revolving in the stationary field existing in the stator by reason of the energization of some or all of the coils. The movement of the motor is communicated by the gearing 14 to the controller drum 10, whereby one of the training motors 2 or 3 will be started to train the projector in the required direction. The starting of the training motor also starts the brushes 21 of the commutating device 20, thereby setting up a revolving field in the coils 19 of the stator of the pilot motor. The absolute speed of rotation of the rotor of said motor is the algebraic sum of the speeds of the rotative fields in said rotor and stator. If they are equal and of opposite sign, the rotor will remain stationary in space, holding the controller closed, so that the training motor continues operating so long as the operator rotates the handle 18. If he stops the handle, the continued rotation of the training motor will cause the controller to be brought back to the stop position by the rotating field of the stator.

This mode of control can be applied to existing searchlight projectors which have training motors, and greatly simplifies the handling of such projectors from a distant station. The only apparatus necessary at such station is the pair of commutating devices 16, each connected by only three conductors with its pilot motor, which with the corresponding controllers and follow-up commutating device, can all be located near the searchlight projector, if desired.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with a projector, of an electric motor for training the same, a controller for said motor, a synchronous motor for operating said controller, manual devices for setting up a rotating field in one member of said synchronous motor, and means whereby the training motor can establish an opposite rotating field in the other member thereof.

2. The combination with a projector, of an electric motor for training the same, a controller for said motor, a synchronous motor having its rotor arranged to rotate said controller, a manually operated commutating device for setting up a rotating field in said motor, and means whereby the training motor can establish an oppositely rotating field in the stator of said synchronous motor.

3. The combination with a projector, of an electric motor for training the same, a controller for said motor, a synchronous pilot motor operatively connected to said controller, a manually operated commutating device for setting up a rotating field in one member of said pilot motor, and a second commutating device driven by the training motor and serving to establish an oppositely rotating field in the other member of said pilot motor.

4. The combination with a projector, of an electric motor for training the same, a controller for said motor, a synchronous pilot motor for operating said controller, and two commutating devices controlling respectively the current in the rotor and stator of said pilot motor, one of said devices being actuated by hand and the other by the training motor.

In witness whereof, I have hereunto set my hand this 26th day of September, 1912.

JOHN L. HALL.

Witnesses:
BENJAMIN B. HULL,
HELEN ORFORD.